United States Patent [19]

Siegel

[11] Patent Number: 4,887,870
[45] Date of Patent: Dec. 19, 1989

[54] FEED PUMP FOR BRAKE SYSTEMS

[75] Inventor: Heinz Siegel, Stuttgart, Fed. Rep. of Germany

[73] Assignee: Robert Bosch GmbH, Stuttgart, Fed. Rep. of Germany

[21] Appl. No.: 182,596

[22] Filed: Apr. 18, 1988

[30] Foreign Application Priority Data

Aug. 14, 1987 [DE] Fed. Rep. of Germany ....... 3727174

[51] Int. Cl.⁴ .................... F04B 11/00; B60T 13/16; B60T 17/02
[52] U.S. Cl. .................................... 303/116; 60/565; 60/591; 417/540
[58] Field of Search .................. 417/540, 542; 60/591, 60/592, 565; 303/116, 10

[56] References Cited

U.S. PATENT DOCUMENTS

| | | | |
|---|---|---|---|
| 2,811,931 | 11/1957 | Everett | 417/540 X |
| 3,645,584 | 2/1972 | Leiber et al. | 303/10 X |
| 4,734,011 | 3/1988 | Hall, Jr. | 417/540 X |

Primary Examiner—Leonard E. Smith
Attorney, Agent, or Firm—Edwin E. Greigg

[57] ABSTRACT

A feed pump, preferably for anti-skid brake systems, having at least one shaft-driven pump piston and at least one compensation element. Some of the brake fluid fed by the pump piston into the brake system during the compression stroke is received in a compensation chamber of the compensation element. During the ensuing intake stroke of the pump piston, an eccentric shaft that also actuates the pump piston actuates a compensation piston of the compensation element, in order to feed the brake fluid that has been temporarily stored in the compensation chamber into the brake system.

16 Claims, 3 Drawing Sheets

FEED PUMP FOR BRAKE SYSTEMS

BACKGROUND OF THE INVENTION

The invention relates to improvements in feed pumps for vehicle brake systems.

Shaft-driven feed pumps having pump pistons for anti-skid brake systems are known which on the intake side feed the brake fluid, cut off by a regulating valve of the anti-skid brake system, back from a low-pressure reservoir to the pressure system. The feed pumps of known design have the disadvantage that the pressure system is subject to pressure peaks during the compression stroke of the feed pump piston, and no brake fluid is pumped during the intake stroke of the pump piston.

OBJECT AND SUMMARY OF THE INVENTION

The feed pump according to the invention has the advantage over the prior art that the pressure peaks are reduced and pumping is made more uniform by equipping the feed pump with a compensation element. A pump piston of a pumping element of the feed pump is driven by a shaft and during the compression stroke pumps the volume of brake fluid located in its piston cylinder into the brake system. Some of the brake fluid pumped is received by a compensation piston chamber of a compensation element. In the ensuing intake stroke of the pump piston, a compensation piston, driven by the shaft, pumps the brake fluid located in the compensation piston chamber into the brake system.

It is particularly advantageous to dispose the pumping element and the compensation element in one housing. The elements can be driven by a single eccentric shaft, which makes for a compact structure.

Structuring the elements separately makes it easy to design the pump housing for a plurality of element pairs. If a feed pump is equipped with two pumping elements and two compensation elements, two brake circuits can be supplied.

In that case it is particularly advantageous for the two compensation elements to be disposed on the shaft offset by 180° and facing one another, so that the same reaction force of the pistons on the shaft, does not subject the shaft to any bending strain.

If the compensation piston fluid displacement has one-half the capacity of the piston fluid displacement of the pump piston, then the pressure amplitudes are reduced to a level to which the pressure amplitudes originating in the compensation piston rise. An optimal evening-out of the feed flow at a constant feed output is attained.

If the compensation element is manufactured with the same outer contour as the pumping element, then an element receptacle for the compensation element and the pumping element on the housing of the feed pump can be prefabricated with the same tools. This leads to a particularly cost-effective manufacture of the feed pump.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
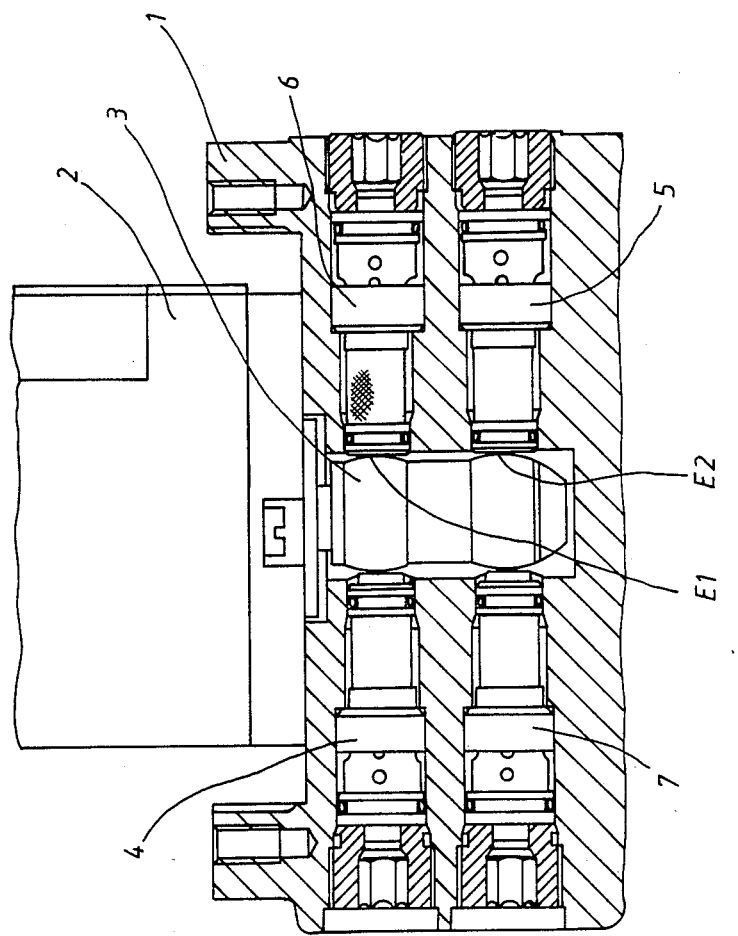
FIG. 1 is a sectional view of an exemplary embodiment of a feed pump.

The feed pump 1 shown in FIG. 1 is driven by an electric motor 2, via a shaft 3 which includes eccentric elements E1, E2. The electric motor 2 actuates a pumping element 4 and a compensation element 5 corresponding to this pumping element 4. The feed pump 1 shown here is also equipped with a further pumping element 6 and a further compensation element 7 for a second brake circuit.

Figure 2:
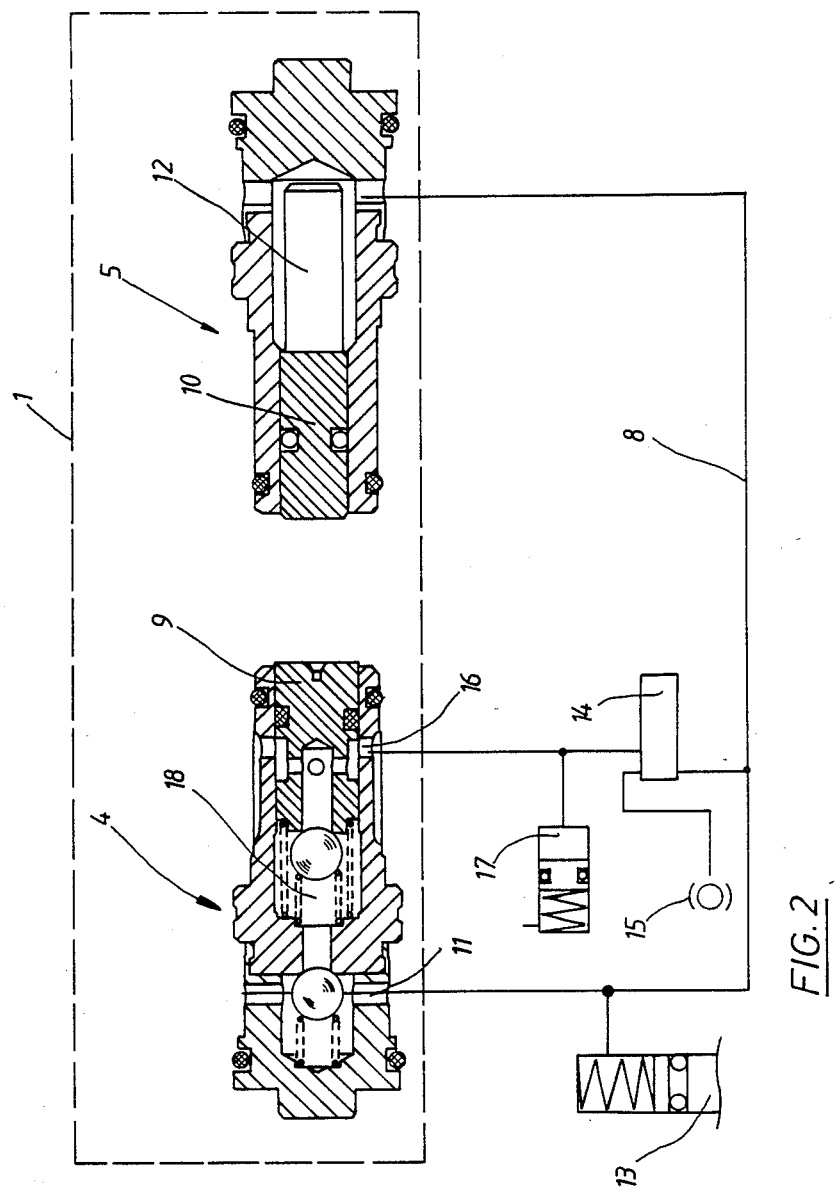
FIG. 2 is a simplified system layout including a feed pump of an anti-skid brake system.

In FIG. 2, the pumping element 4 communicates via a pressure line 8 with the compensation element 5.

The eccentric elements E1, E2 of the shaft 3 are disposed such that the pump piston 9 of the pumping element 4 and the compensation piston 10 of the compensation element 5 are driven countercyclically, i.e., their pressure strokes are 180° from each other. The same applies to the elements 6, 7 of the second brake circuit.

The outlet 11 of the pumping element 4 on the pressure side communicates via the pressure line 8 of the brake circuit with the compensation piston cylinder 12. Also connected to the pressure line 8, which belongs to the anti-skid brake system, are a master brake cylinder 13 and a magnetic valve 14. An outlet of the magnetic valve 14 communicates with the wheel brake 15. A second outlet of the magnetic valve 14 communicates with the intake-side connection 16 of the pumping element 4 of the feed pump 1, which is used as a recirculating pump. A low-pressure reservoir 17 having a damping action is connected parallel to the connection 16 of the pumping element 4.

If the pump piston 9 of the pumping element 4 feeds the brake fluid located in the piston cylinder 18 into the brake circuit, then some of the brake fluid pumped is received by the compensation piston cylinder 12. In the intake stroke of the pump piston 9, the piston cylinder 18 of the pump piston 9 receives the brake fluid, cut off by the magnetic valve 14, from the low-pressure reservoir 17, while the brake fluid temporarily stored by the compensation piston cylinder 12 is fed by the compensation piston 10 into the brake circuit. The piston 6 and compensation element 7 operates the same as piston 4 and compensation piston 5 for a second brake line.

Figure 3:
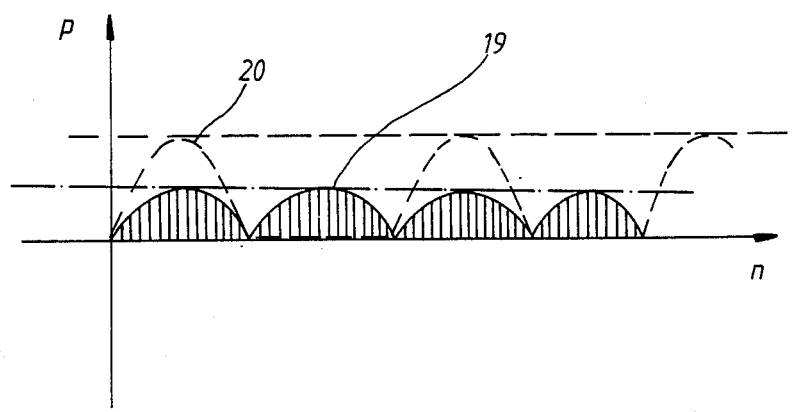
FIG. 3 shows the course of the pressure in the anti-skid brake system.

In FIG. 3, the solid-line curve 19 represents the pressure P, plotted over the rpm n of the feed pump 1 having the compensation element 5. Contrarily, the dashed-line curve 20 represents the course of pressure in a prior art feed pump that does not have any compensation element.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A feed pump for brake systems including an anti-skid brake system, which comprises a first pump piston (9), said first pump piston (9) includes a cylindrical piston cylinder (18) which communicates on a pressure slide via a pressure line (8) with a cylindrical compensation piston cylinder (12), said cylindrical compensation piston cylinder is smaller than the cylindrical piston cylinder (18) of the pump piston (9), and a first compensation piston (10) associated with said compensation piston cylinder (12) is actuated in a shaft-driven manner counter-cyclically to the first pump piston (9), and said feed pump includes a second pumping piston (6) and a second compensation element (7), which are disposed facing respectively corresponding first pump piston (9) and first compensation element (10).

2. A feed pump as defined by claim 1, in which said first compensation piston cylinder (12) has one-half the volume of said first piston cylinder (18) of said first pump piston (9).

3. A feed pump as defined by claim 1, in which said first pump piston (9) and said second pumping piston (6) have identical outer contours, and said first compensation piston (10) and said second compensation element (7) have identical outer contours.

4. A feed pump for brake systems including an anti-skid brake system, which comprises a first pump piston (9), said first pump piston (9) includes a cylindrical piston cylinder (18) which communicates on a pressure slide via a pressure line (8) with a cylindrical compensation piston cylinder (12), said cylindrical compensation piston cylinder is smaller than the cylindrical piston cylinder (18) of the pump piston (9), and a first compensation piston (10) associated with said compensation piston cylinder (12) is actuated in a shaft-driven manner counter-cyclically to the first pump piston (9), said feed pump includes a second pumping piston (6) and a second compensation element (7), which are disposed facing respectively corresponding first pump piston (9) and first compensation element (10), and first and second pump pistons (9, 6) and said first and second compensation pistons (10, 7) are driven by a common shaft (3).

5. A feed pump as defined by claim 4, in which said first compensation piston cylinder (12) has one-half the volume of said first piston cylinder (18) of said first pump piston (9).

6. A feed pump as defined by claim 4, in which said first pump piston (9) and said second pumping piston (6) have identical outer contours, and said first compensation piston (10) and said second compensation element (7) have identical outer contours.

7. A feed pump for brake systems including an anti-skid brake system, which comprises a first pump piston (9), said first pump piston (9) includes a cylindrical piston cylinder (18) which communicates on a pressure slide via a pressure line (8) with a cylindrical compensation piston cylinder (12), said cylindrical compensation piston cylinder is smaller than the cylindrical piston cylinder (18) of the pump piston (9), and a first compensation piston (10) associated with said compensation piston cylinder (12) is actuated in a shaft-driven manner counter-cyclically to the first pump piston (9), said feed pump includes a second pumping piston (6) and a second compensation element (7), which are disposed facing respectively corresponding first pump piston (9) and first compensation element (10), said first and second pump pistons (9, 6) and said first and second compensation pistons (10, 7) are disposed in a common housing, and said first and second pump pistons (9, 6) and said first and second compensation pistons (10, 7) are actuated by two separate eccentric elements (E1, E2) disposedly spaced apart on a common drive shaft (3).

8. A feed pump as defined by claim 7, in which said first compensation piston cylinder (12) has one-half the volume of said first piston cylinder (18) of said first pump piston (9).

9. A feed pump as defined by claim 7, in which said first pump piston (9) and said second pumping piston (6) have identical outer contours, and said first compensation piston (10) and said second compensation element (7) have identical outer contours.

10. A feed pump for brake systems including an anti-skid brake system, which comprises at least one pump piston (9), said pump piston (9) includes a cylindrical piston cylinder (18) which communicates on a pressure slide via a pressure line (8) with a cylindrical compensation piston cylinder (12), said cylindrical compensation piston cylinder is smaller than the cylindrical piston cylinder (18) of the pump piston (9), and a compensation piston (10) associated with said compensation piston cylinder (12) is actuated in a shaft-driven manner counter-cyclically to the pump piston (9), said piston (9) and said compensation piston (10) are disposed in a common housing and actuated by two separate eccentric elements (E1, E2) spaced apart on a common shaft (3) which drives said piston and said compensation piston (10), a drive motor (2) which drives said common shaft (3), said compensation piston operates along an axis which is disposed parallel to and offset from an axis of the functionally associated pump piston cylinder (18) substantially by an axial spacing of said two eccentric elements (E1, E2), said pump piston cylinder (18) is disposed closer to said drive motor (2) of the pump than the compensation piston cylinder (12), and cylinder (12) faces the pump piston cylinder (18) and points in an opposite direction.

11. A feed pump as defined by claim 10, in which said compensation piston cylinder (12) has one-half the volume of said piston cylinder (18) of the pump piston (9).

12. An anti-skid brake system, which comprises a feed pump, a master cylinder (13), a magnetic valve (14) and at least one brake connected to said magnetic valve (14), said feed pump including at least one pump piston (9), said pump piston (9) includes a cylindrical piston cylinder (18) which communicates on a pressure outlet slide via a pressure line (8) with said master cylinder, said magnetic valve and with a cylindrical compensation piston cylinder (12), said cylindrical compensation piston cylinder is smaller than the cylindrical piston cylinder (18) of the pump piston (9), and a first compensation piston (10) associated with said compensation piston cylinder (12) is actuated in a shaft-driven manner counter-cyclically to said first pump piston (9).

13. A feed pump as defined by claim 12, in which said pump piston (9) and said compensation piston (10) are driven by a common shaft (3).

14. A feed pump as defined by claim 13, in which said compensation piston cylinder (12) has one-half the volume of said piston cylinder (18) of the pump piston (9).

15. A feed pump as defined by claim 13, in which said piston (9) and said compensation piston (10) are disposed in a common housing, and said pump piston (9) and said compensation piston (10) are actuated by two separate eccentric elements (E1, E2) disposed spaced apart on said shaft (3).

16. A feed pump as defined by claim 15, in which said compensation piston cylinder (12) has one-half the volume of said piston cylinder (18) of the pump piston (9).

* * * * *